(12) United States Patent
Fujita et al.

(10) Patent No.: US 11,855,509 B2
(45) Date of Patent: Dec. 26, 2023

(54) ROTATING ELECTRICAL MACHINE

(71) Applicant: HITACHI ASTEMO, LTD., Hitachinaka (JP)

(72) Inventors: Hayato Fujita, Ibaraki (JP); Yuichiro Baba, Ibaraki (JP); Ryoji Kobayashi, Ibaraki (JP); Toshiki Takahashi, Ibaraki (JP); Takuya Miyagi, Ibaraki (JP); Kenji Nakayama, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/627,299

(22) PCT Filed: Jul. 10, 2020

(86) PCT No.: PCT/JP2020/026964
§ 371 (c)(1),
(2) Date: Jan. 14, 2022

(87) PCT Pub. No.: WO2021/010306
PCT Pub. Date: Jan. 21, 2021

(65) Prior Publication Data
US 2022/0247255 A1    Aug. 4, 2022

(30) Foreign Application Priority Data
Jul. 16, 2019  (JP) ................ 2019-130817

(51) Int. Cl.
*H02K 5/124*   (2006.01)
*H02K 5/20*    (2006.01)

(52) U.S. Cl.
CPC .............. *H02K 5/124* (2013.01); *H02K 5/20* (2013.01); *H02K 5/203* (2021.01)

(58) Field of Classification Search
CPC ........... H02K 5/124; H02K 5/203; H02K 5/20
(Continued)

(56) References Cited

U.S. PATENT DOCUMENTS

2017/0141640 A1*   5/2017   Kobayashi .............. H02K 5/10

FOREIGN PATENT DOCUMENTS

| JP | H03-048346 U |   | 5/1991 |
| JP | 05290563 A | * | 11/1993 |

(Continued)

OTHER PUBLICATIONS

International Search Report with English translation and Written Opinion issued in corresponding application No. PCT/JP2020/026964 dated Oct. 6, 2020.

*Primary Examiner* — Jose A Gonzalez Quinones
(74) *Attorney, Agent, or Firm* — Foley & Lardner LLP (57) ABSTRACT

An object of the present invention is to provide a sealing member that provides high sealability in a coolant flow path. A rotating electrical machine includes a stator core around which a winding is wound, a stator frame that supports the stator core, a housing that is disposed outside the stator frame and forms a flow path space with the stator frame, and a sealing member that is disposed between the stator frame and the housing. The housing includes a mounting portion on which the sealing member is mounted. The sealing member includes a base portion that is in contact with the housing and the stator frame, and an attachment portion that protrudes from the base portion and is inserted to the mounting portion of the housing.

6 Claims, 7 Drawing Sheets

(58) Field of Classification Search
USPC .................................................. 310/89, 90
See application file for complete search history.

(56) References Cited

FOREIGN PATENT DOCUMENTS

| JP | H05-290563 A | | 11/1993 |
|----|--------------|---|---------|
| JP | H09-309563 A | | 12/1997 |
| JP | 2009-247085 A | | 10/2009 |
| JP | 2015-82897 A | | 4/2015 |
| JP | 2015082897 A | * | 4/2015 |
| JP | 2017-93264 A | | 5/2017 |

\* cited by examiner

ROTATING ELECTRICAL MACHINE

TECHNICAL FIELD

The present invention relates to a rotating electrical machine.

BACKGROUND ART

A device used in an automobile is required to be downsized and to have high output, and a rotating electrical machine is cooled by a coolant in order to cool heat generated in a stator conductor due to an increase in current amount.

Background art of the present technical field includes the following prior art. PTL 1 (JP 2009-247085 A) discloses a rotating electrical machine that includes a stator and a rotor rotatably held inside the stator with a predetermined gap. A coolant passage is located on an outer periphery of the stator and is formed in a band shape in a circumferential direction by a bracket. The coolant passage includes a boundary wall, a coolant introduction port provided on one side with the boundary wall interposed therebetween, and a coolant discharge port provided on the other side. The boundary wall is formed so that a distance between the boundary wall and the coolant discharge port is smaller than a distance between the boundary wall and the coolant introduction portion (see ABSTRACT).

CITATION LIST

Patent Literature

PTL 1: JP 2009-247085 A

SUMMARY OF INVENTION

Technical Problem

However, in the rotating electrical machine disclosed in PTL 1, since the boundary wall is integrally molded with a center bracket by casting such as die casting, there is a problem that the sealability is low in the coolant flow path formed between the center bracket and the rear bracket.

Therefore, the present invention is required to provide a boundary wall (sealing member) that provides sealability in a coolant flow path.

Solution to Problem

A representative example of the invention disclosed in this application is as follows. That is, a rotating electrical machine includes a stator core around which a winding is wound, a stator frame that supports the stator core, a housing that is disposed outside the stator frame and forms a flow path space with the stator frame, and a sealing member that is disposed between the stator frame and the housing. The housing includes a recess portion on which the sealing member is mounted. The sealing member includes a base portion that is in contact with the housing and the stator frame, and a convex portion that protrudes from the base portion and is inserted to the recess portion of the housing.

Advantageous Effects of Invention

According to the present invention, objects, configurations, and effects other than those described above capable of providing a sealing member having high sealability in a coolant flow path will be clarified by the descriptions of embodiments as follows.

DESCRIPTION OF EMBODIMENTS

Hereinafter, embodiments of the present invention will be described with reference to the drawings.

Figure 1:
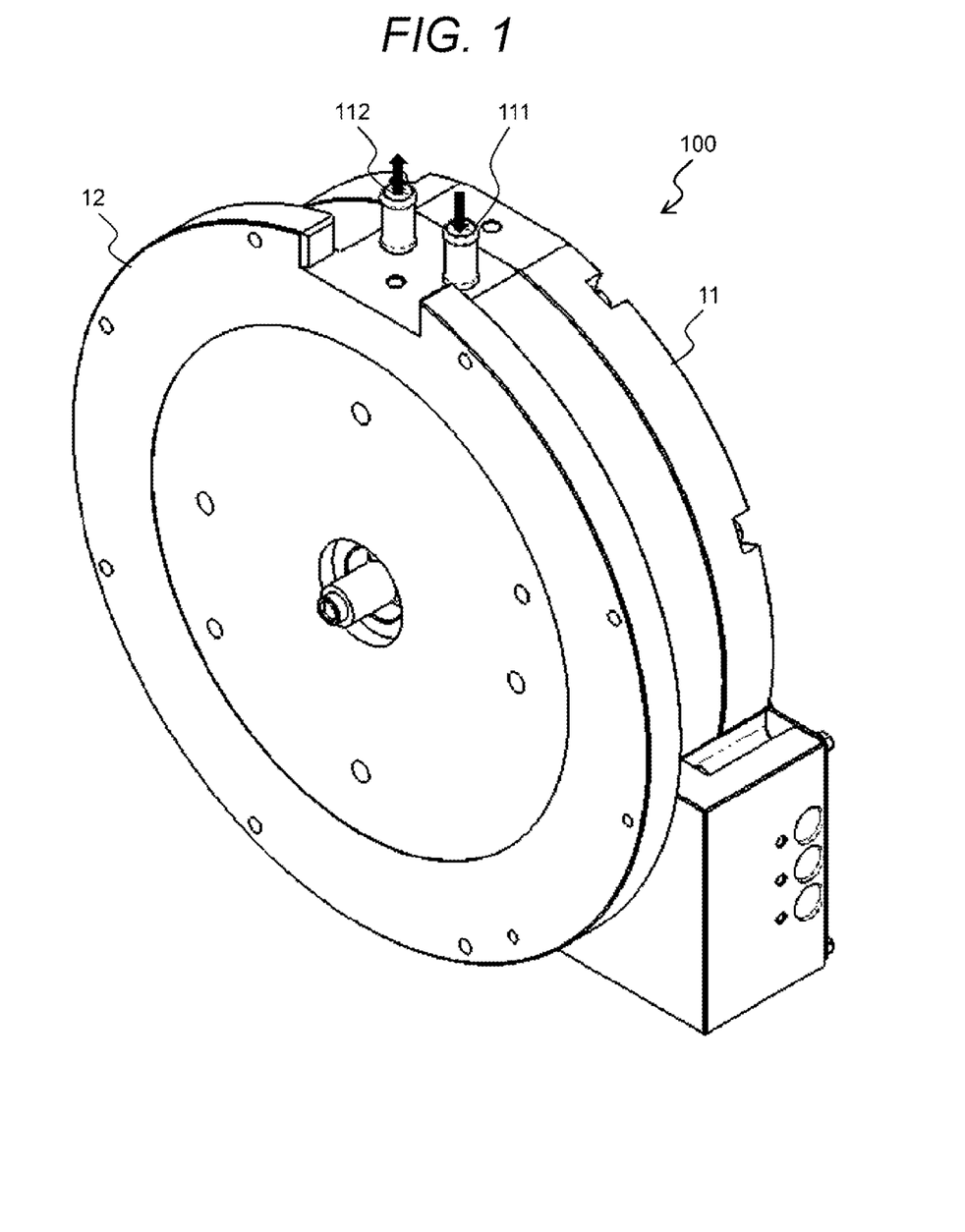
FIG. 1 is a perspective view of a rotating electrical machine according to an embodiment of the present invention.
Figure 2:
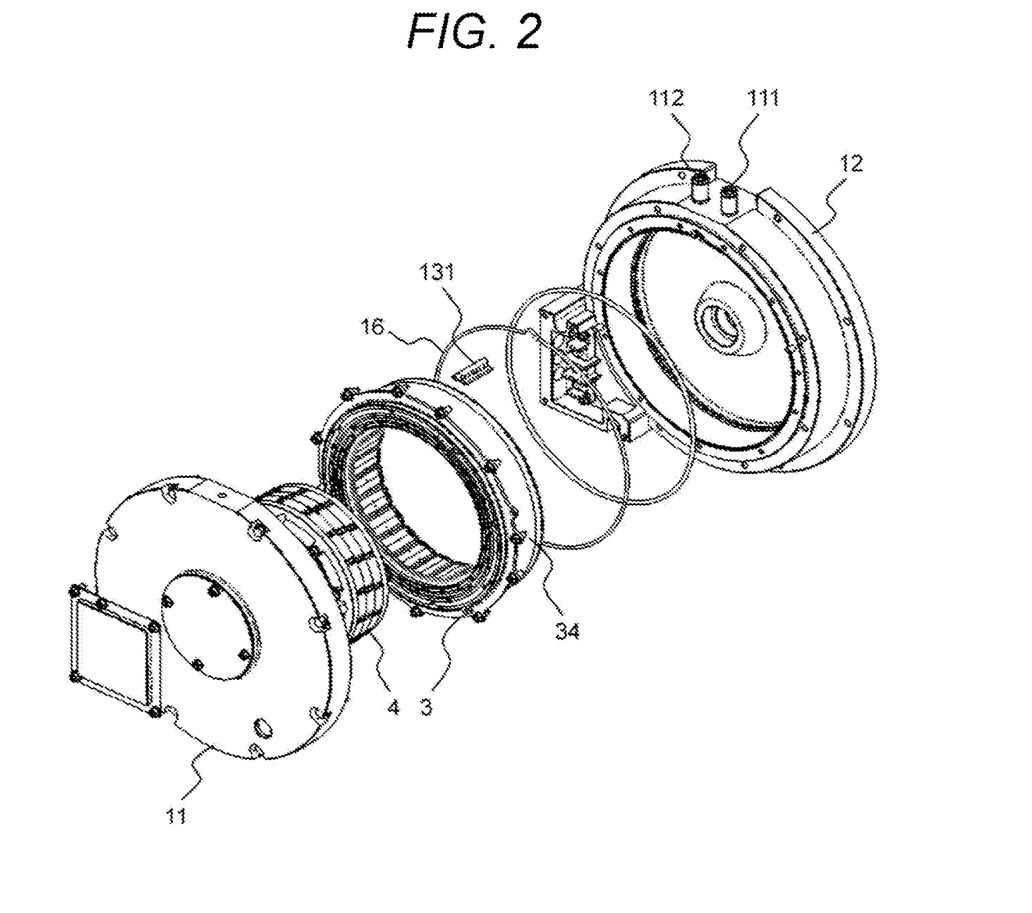
FIG. 2 is an exploded perspective view illustrating an overall configuration of the rotating electrical machine.
Figure 3:
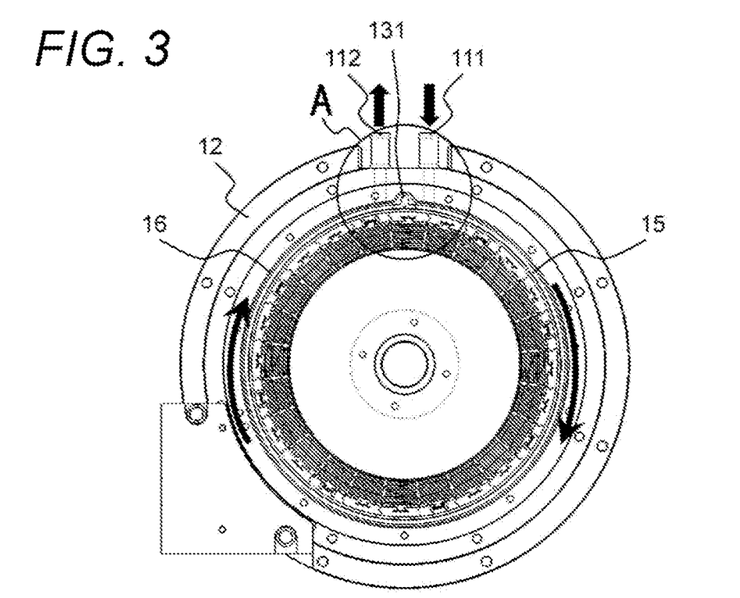
FIG. 3 is a front view of the rotating electrical machine in a state where a rear housing is removed.
Figure 4:
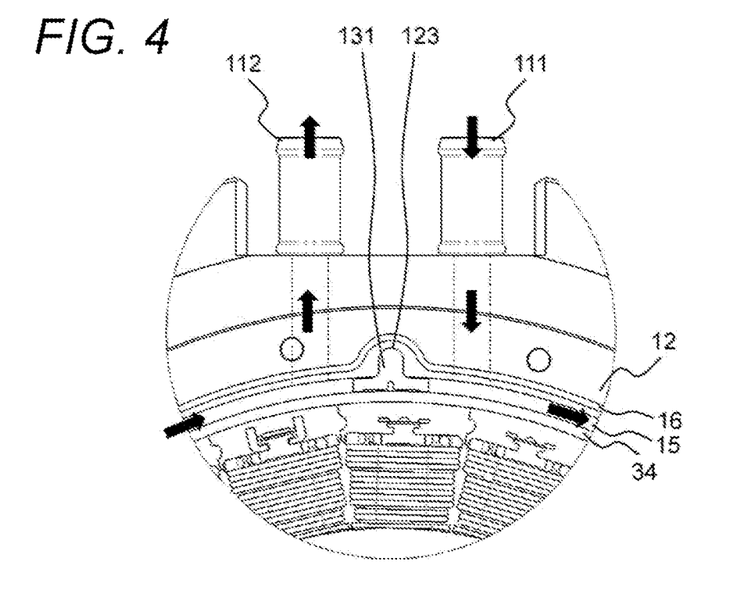
FIG. 4 is an enlarged view of a portion A in FIG. 3.

FIG. 1 is a perspective view of a rotating electrical machine 100 according to an embodiment of the present invention. FIG. 2 is an exploded perspective view illustrating an overall configuration of the rotating electrical machine 100. FIG. 3 is a front view of the rotating electrical machine 100 in a state where a rear housing 11 and a rotor 4 are removed. FIG. 4 is an enlarged view of a portion A in FIG. 3.

The rotating electrical machine 100 includes a vessel-shaped front housing 12 having an opening at one end in an axial direction, and the rear housing 11 that closes the opening. A coolant introduction port 111 and a coolant discharge port 112 are provided to be spaced from each other at a rear portion of the front housing 12 in the axial direction. The front housing 12 and the rear housing 11 are fixed by a plurality of bolts. A coolant flow path 15 is formed in a band shape in the circumferential direction of the rotating electrical machine 100 between a stator 3 (the outermost stator frame 34) and the front housing 12.

As illustrated in FIGS. 2 and 3, the front housing 12 and the stator frame 34 have a cylindrical shape. The coolant flow path 15 is formed in a manner that the stator frame 34 is assembled to the front housing 12 from the axial direction via leakage prevention components such as an O-ring 16 and a sealing member 131. The front housing 12 has a recess portion 123 for mounting the sealing member 131, and fixes the sealing member 131 to be positioned in the coolant flow path 15 between the coolant introduction port 111 and the coolant discharge port 112.

As illustrated in FIGS. 3 and 4, the coolant flow path 15 is provided between the front housing 12 and the stator frame 34, and is separated from an external environment by the O-ring 16. The coolant flow path 15 is partitioned between an introduction side and a discharge side by the sealing member 131. The sealing member 131 is formed of an elastic material (for example, EPDM) to be easily deformed, and is disposed by being compressed between the front housing 12 and the stator frame 34.

The stator 3 is mounted inside the front housing 12. The rotor 4 is rotatably held inside the stator 3.

The stator 3 is formed by winding a stator coil around a plurality of teeth provided on a stator core formed by laminating electromagnetic steel plates and separated by a bobbin, and the stator frame 34 is attached to the outside of the stator core. When the rotating electrical machine 100 operates and a current flows in the stator coil, the stator coil generates heat due to a copper loss. Since the stator coil is densely disposed in the stator 3, heat due to a copper loss is accumulated, and the temperature tends to increase. Therefore, the stator 3 is cooled by a coolant flowing through the coolant flow path 15 provided on the outer periphery of the stator frame 34.

The rotor 4 includes a plurality of magnets inserted into a plurality of slots provided in a rotor core formed by laminating electromagnetic steel plates. The rotor core is fastened to a shaft (not illustrated) by shrink fitting or press fitting. A shaft is rotatably supported via bearings provided in the rear housing 11 and the front housing 12, and outputs power from a portion protruding from the front housing 12.

The rotating electrical machine 100 having such a configuration is installed, for example, in an engine room of a vehicle (not illustrated), and transmits a driving force via a belt or a gear. The rotating electrical machine is connected to a control device such as an inverter by a three-phase power supply cable, and thus an operation (drive and power generation) is controlled.

The shape of the sealing member 131 in each embodiment will be described in detail below.

Embodiment 1

Figure 5:
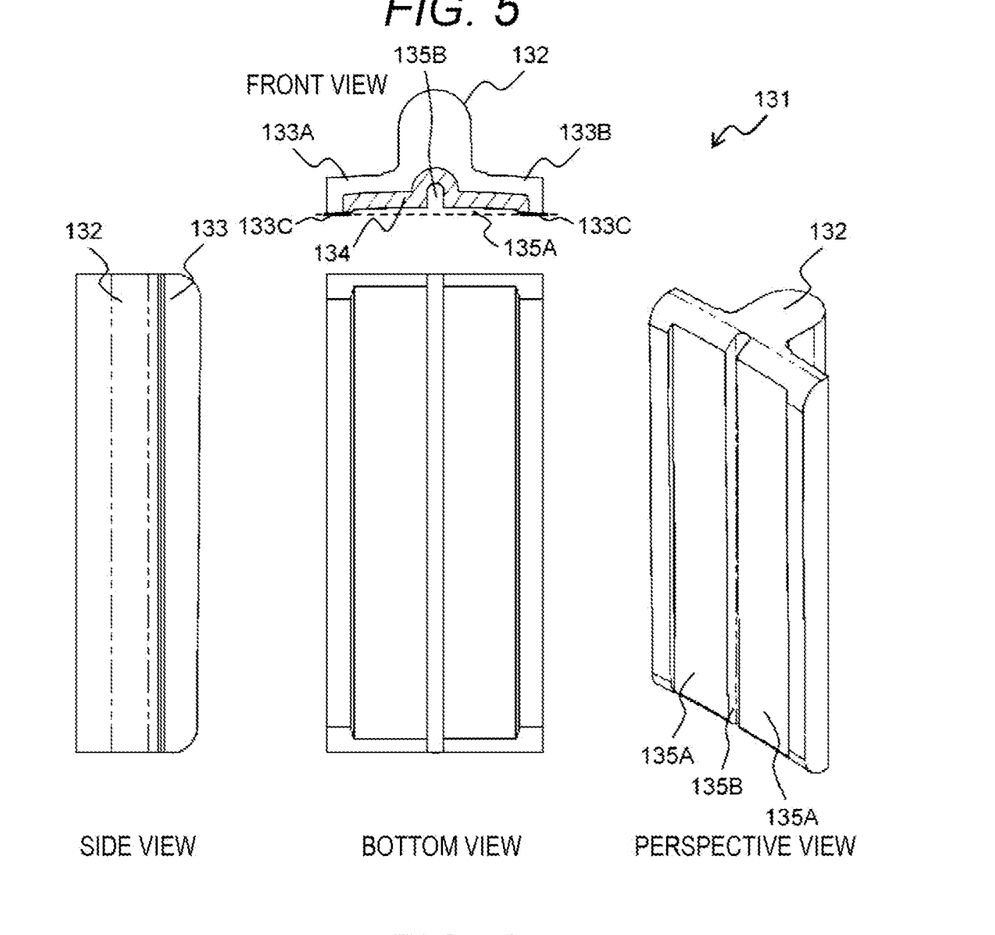
FIG. 5 is a view illustrating a shape of a sealing member in Embodiment 1.
Figure 6:
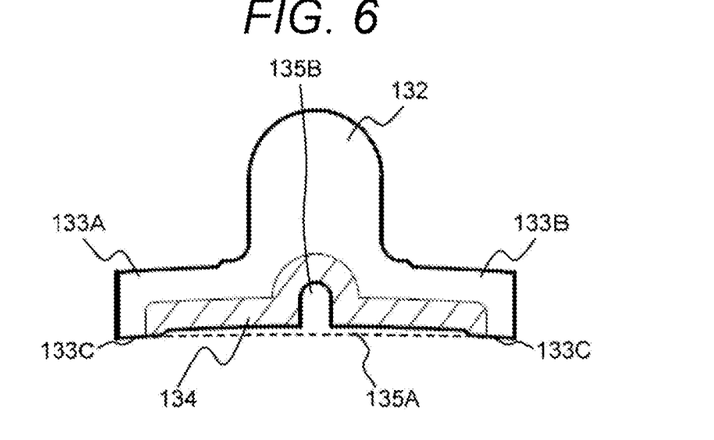
FIG. 6 is a front view illustrating a shape of the sealing member before insertion.
Figure 7:
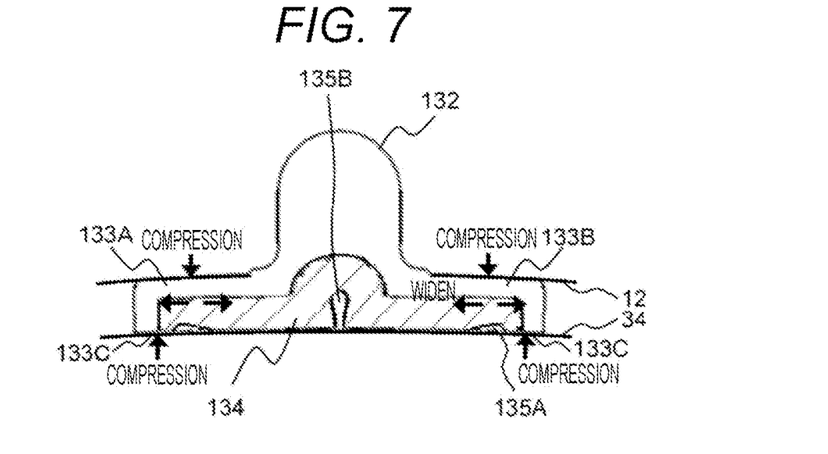
FIG. 7 is a front view illustrating a shape of the mounted sealing member.

FIG. 5 is a view illustrating the shape of the sealing member 131 in Embodiment 1. FIG. 6 is a front view illustrating the shape of the sealing member 131 before mounting. FIG. 7 is a front view illustrating the shape of the sealing member 131 attached between the front housing 12 and the stator frame 34.

The sealing member 131 in Embodiment 1 includes a convex portion 132 inserted into the recess portion 123 of the front housing 12, a base portion 133 in contact with the outer surface of the stator frame 34, and a space forming portion 134 on the lower surface (the surface opposite to the convex portion 132) of the base portion 133.

The base portion 133 includes a base first portion 133A provided on the left side of the convex portion 132 and a base second portion 133B provided on the right side, and is formed in a shape spreading to the left and right. The base first portion 133A and the base second portion 133B have a protrusion portion 133C that protrudes from the base portion 133 toward the stator frame 34. The height of the protrusion portion 133C is smaller than the height of the base portion 133, and is about 1/10 in the present embodiment. In addition, the base portion 133 has a space forming portion 134 configured by the protrusion portion 133C, the base first portion 133A, and the base second portion 133B. The space forming portion 134 includes a first space portion 135A that forms a space with the sealing member 131 along the stator frame 34, and a second space portion 135B that forms a space protruding toward the convex portion 132 at the central portion of the sealing member 131.

As illustrated in FIG. 7, when the stator frame 34 is assembled to the front housing 12, the protrusion portion 133C of the sealing member 131 comes into contact with the stator frame 34 and is compressed by the front housing 12 and the stator frame 34. A portion of the volume of the protrusion portion 133C compressed by the stator frame 34 compresses the base first portion 133A and the base second portion 133B. A portion of the volume of the space forming portion 134 is pushed toward the stator frame 34. The pushed space forming portion 134 comes into contact with the stator frame 34.

In this structure, an area in which the stator frame 34 compresses the sealing member 131 is a portion of the sealing member 131 facing the stator frame 34. Thus, an area in which the sealing member 131 and the stator frame 34 are in contact with each other is substantially the entire surface of the sealing member 131 facing the stator frame 34 while suppressing the load of compressing the sealing member 131, and thus it is possible to secure the sealability between the stator frame 34 and the sealing member 131. Thus, the frictional force when the stator frame 34 is assembled to the front housing 12 from the axial direction while the sealing member 131 is compressed can be reduced while securing the sealability for separating the flow path from the coolant introduction port 111 and the flow path to the coolant discharge port 112 from each other. Thus, the favorable assembling workability is obtained.

The front housing 12 and the stator frame 34 have manufacturing tolerances. Thus, the compression margin of the sealing member 131 varies depending on the combination of the front housing 12 and the stator frame 34. When the compression margin is large, not only the protrusion portion 133C but also the space forming portion 134 is compressed. When the space forming portion 134 is compressed, a portion of the volume of the space forming portion 134 expands toward the second space portion 135B, and the space volume of the second space portion 135B decreases. Therefore, the reaction force due to the compression of the space forming portion 134 of the sealing member 131 between the front housing 12 and the stator frame 34 is alleviated. Thus, it is possible to reduce the frictional force when the stator frame 34 is assembled to the front housing 12 while securing the contact area between the sealing member 131 and the stator frame 34, which is related to the sealability between the flow path from the coolant introduction port 111 and the flow path to the coolant discharge port 112.

In the present embodiment, it is possible to not only reduce the frictional force when the stator frame 34 is inserted into the front housing 12, but also suppress the load in the radial direction of the stator frame 34 due to the compressive reaction force of the sealing member 131. Thus, the coaxial accuracy at the time of assembling the front housing 12 and the stator frame 34 is easily secured. Since the front housing 12 supports the rotor 4, this configuration also contributes to improvement of the coaxial accuracy between the stator 3 and the rotor 4.

Since the base portion 133 includes the base first portion 133A provided on the right side of the convex portion 132 and the base second portion 133B provided on the left side, the sealing member 131 is supported at three points. Thus, it is possible to equalize the compressive load applied to the sealing member 131 and to easily secure the sealability. In addition, since the compressive load is equalized, the compressive reaction force of the sealing member 131 is easily aligned on the same line as the radial direction from the central axis of the front housing 12. Thus, when the stator frame 34 is assembled to the front housing 12, the front housing 12 and the stator frame 34 are easily aligned coaxially, and the excellent assembling workability is obtained.

Embodiment 2

Figure 8:
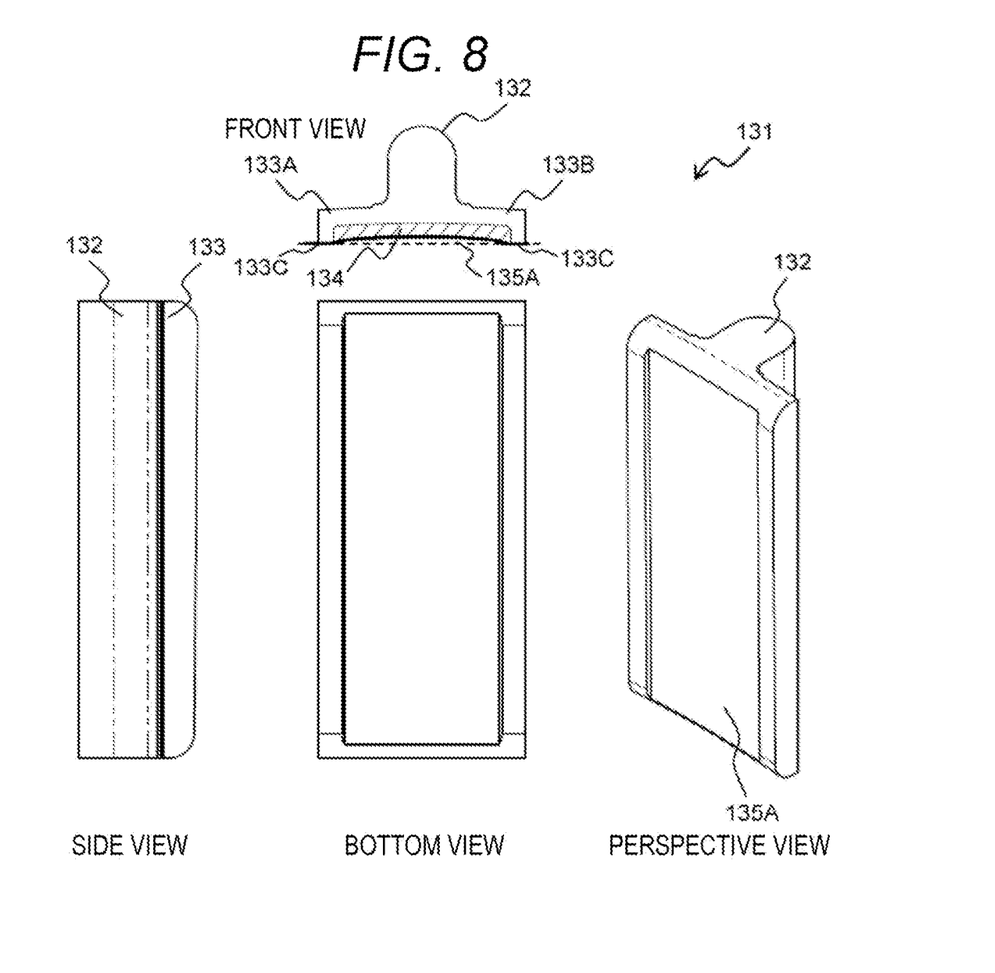
FIG. 8 is a view illustrating a shape of a sealing member in Embodiment 2.

FIG. 8 is a view illustrating a shape of a sealing member 131 in Embodiment 2.

The sealing member 131 in Embodiment 2 is different from the sealing member 131 in Embodiment 1 described above in that the sealing member does not have the second space portion 135B, but has the similar function and effect to a portion of Embodiment 1. Description of components having the same functions as those in Embodiment 1 will be omitted, and different components will be mainly described.

In Embodiment 2, the base portion 133 includes a protrusion portion 133C and a space forming portion 134 including a base first portion 133A and a base second portion 133B. The space forming portion 134 has a first space portion 135A that forms a space with the sealing member 131 along the stator frame 34. The height of the protrusion portion 133C is smaller than the height of the base portion 133, and is about 1/10 in the present embodiment.

When the stator frame 34 is assembled to the front housing 12, the protrusion portion 133C of the sealing member 131 comes into contact with the stator frame 34 and is compressed by the front housing 12 and the stator frame 34. A portion of the volume of the protrusion portion 133C compressed by the stator frame 34 compresses the base first portion 133A and the base second portion 133B. A portion of the volume of the space forming portion 134 is pushed toward the stator frame 34. The pushed space forming portion 134 comes into contact with the stator frame 34.

In this structure, an area in which the stator frame 34 compresses the sealing member 131 is a portion of the sealing member 131 facing the stator frame 34. Thus, an area in which the sealing member 131 and the stator frame 34 are in contact with each other is substantially the entire surface of the sealing member 131 facing the stator frame 34 while suppressing the load of compressing the sealing member 131, and thus it is possible to secure the sealability between the stator frame 34 and the sealing member 131. Thus, the frictional force when the stator frame 34 is assembled to the front housing 12 from the axial direction while the sealing member 131 is compressed can be reduced while securing the sealability for separating the flow path from the coolant introduction port 111 and the flow path to the coolant discharge port 112 from each other. Thus, the favorable assembling workability is obtained.

In the present embodiment, it is possible to not only reduce the frictional force when the stator frame 34 is inserted into the front housing 12, but also suppress the load in the radial direction of the stator frame 34 due to the compressive reaction force of the sealing member 131. Thus, the coaxial accuracy at the time of assembling the front housing 12 and the stator frame 34 is easily secured. Since the front housing 12 supports the rotor 4, this configuration also contributes to improvement of the coaxial accuracy between the stator 3 and the rotor 4.

Since the base portion 133 includes the base first portion 133A provided on the right side of the convex portion 132 and the base second portion 133B provided on the left side, the sealing member 131 is supported at three points. Thus, it is possible to equalize the compressive load applied to the sealing member 131 and to easily secure the sealability. In addition, since the compressive load is equalized, the compressive reaction force of the sealing member 131 is easily aligned on the same line as the radial direction from the central axis of the front housing 12. Thus, when the stator frame 34 is assembled to the front housing 12, the front housing 12 and the stator frame 34 are easily aligned coaxially, and the excellent assembling workability is obtained.

Embodiment 3

Figure 9:
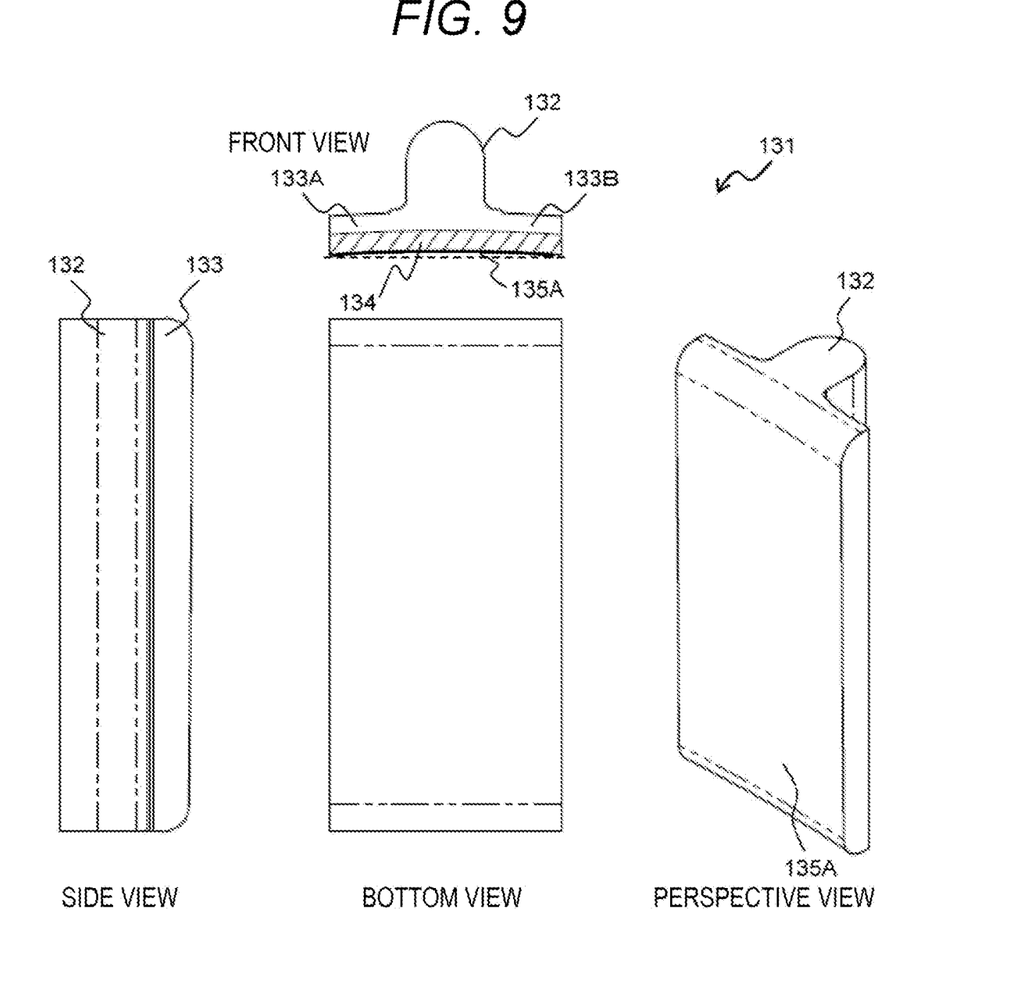
FIG. 9 is a view illustrating a shape of a sealing member in Embodiment 3.

FIG. 9 is a view illustrating a shape of a sealing member 131 in Embodiment 3.

The sealing member 131 in Embodiment 3 is different from the sealing member 131 in Embodiment 2 described above in that a clear protrusion portion 133C is not formed, but a portion of the base first portion 133A and the base second portion 133B has the thickest thickness in the base portion 133, and thus has the similar function to the protrusion portion 133C in Embodiment 2. Therefore, Embodiment 3 has the similar function and effect to a portion of Embodiment 1. Description of components having the same functions as those in Embodiments 1 and 2 will be omitted, and different components will be mainly described.

In Embodiment 3, the base portion 133 includes a space forming portion 134 including a base first portion 133A and a base second portion 133B. The space forming portion 134 has a first space portion 135A that forms a space with the sealing member 131 along the stator frame 34.

When the stator frame 34 is assembled to the front housing 12, the base first portion 133A and the base second portion 133B are compressed by the stator frame 34, and thus a portion of the volume of the space forming portion 134 is pushed out toward the stator frame 34. The pushed space forming portion 134 comes into contact with the stator frame 34.

In this structure, an area in which the stator frame 34 compresses the sealing member 131 is a portion of the sealing member 131 facing the stator frame 34. Thus, an area in which the sealing member 131 and the stator frame 34 are in contact with each other is substantially the entire surface of the sealing member 131 facing the stator frame 34 while suppressing the load of compressing the sealing member 131, and thus it is possible to secure the sealability between the stator frame 34 and the sealing member 131. Thus, the frictional force when the stator frame 34 is assembled to the front housing 12 from the axial direction while the sealing member 131 is compressed can be reduced while securing the sealability for separating the flow path from the coolant introduction port 111 and the flow path to the coolant discharge port 112 from each other, so that the favorable assembling workability is obtained.

In the present embodiment, it is possible to not only reduce the frictional force when the stator frame 34 is inserted into the front housing 12, but also suppress the load in the radial direction of the stator frame 34 due to the compressive reaction force of the sealing member 131. Thus, the coaxial accuracy at the time of assembling the front housing 12 and the stator frame 34 is easily secured. Since the front housing 12 supports the rotor 4, this configuration also contributes to improvement of the coaxial accuracy between the stator 3 and the rotor 4.

Since the base portion 133 includes the base first portion 133A provided on the right side of the convex portion 132 and the base second portion 133B provided on the left side, the sealing member 131 is supported at three points. Thus, it is possible to equalize the compressive load applied to the sealing member 131 and to easily secure the sealability. In addition, since the compressive load is equalized, the compressive reaction force of the sealing member 131 is easily aligned on the same line as the radial direction from the central axis of the front housing 12. Thus, when the stator frame 34 is assembled to the front housing 12, the front housing 12 and the stator frame 34 are easily aligned coaxially, and the excellent assembling workability is obtained.

Embodiment 4

Figure 10:
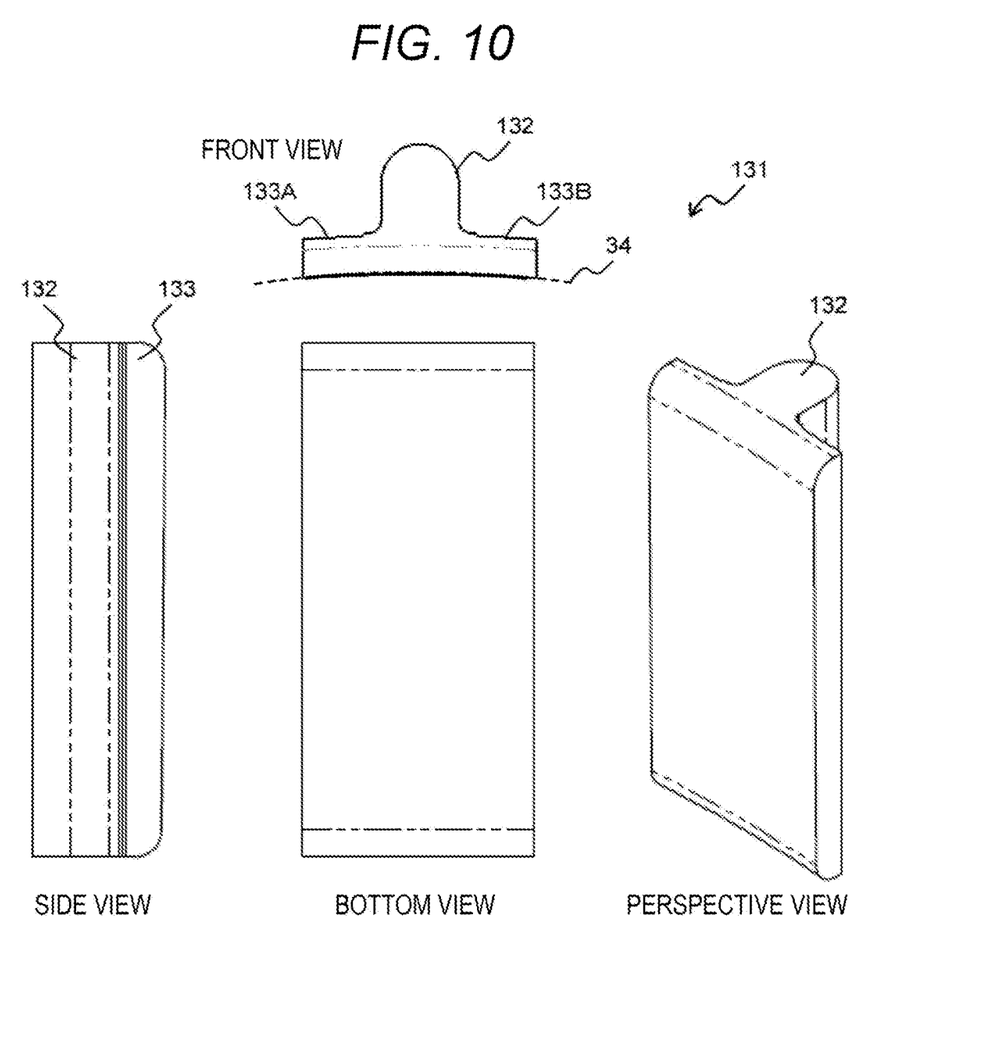
FIG. 10 is a view illustrating a shape of a sealing member in Embodiment 4.

FIG. 10 is a view illustrating a shape of a sealing member 131 in Embodiment 4.

The sealing member 131 in Embodiment 4 is different from the sealing member 131 in the above-described embodiments in that neither the first space portion 135A nor the second space portion 135B is provided, that is, the space forming portion 134 is not provided. However, a portion of the base first portion 133A and the base second portion 133B has the thickest thickness in the base portion 133, and thus has the similar function to the protrusion portion 133C in Embodiment 3 by the elastic deformation of the base portion 133. Therefore, Embodiment 4 has the similar functions and effects to Embodiment 3. Description of components having the same functions as those in Embodiments 1 to 3 will be omitted, and different components will be mainly described.

In Embodiment 4, the base portion 133 includes a base first portion 133A and a base second portion 133B.

When the stator frame 34 is assembled to the front housing 12, the base first portion 133A and the base second portion 133B are compressed by the stator frame 34, and the base portion 133 is pressed against the stator frame 34.

In this structure, an area in which the sealing member 131 and the stator frame 34 are in contact with each other is substantially the entire surface of the sealing member 131 facing the stator frame 34, and it is possible to secure the sealability between the stator frame 34 and the sealing member 131. Therefore, it is possible to secure the sealability for separating the flow path from the coolant introduction port 111 and the flow path to the coolant discharge port 112 from each other.

Since the base portion 133 includes the base first portion 133A provided on the right side of the convex portion 132 and the base second portion 133B provided on the left side, the sealing member 131 is reliably supported from above and below. Thus, it is possible to equalize the compressive load applied to the sealing member 131 and to easily secure the sealability. In addition, since the compressive load is equalized, the compressive reaction force of the sealing member 131 is easily aligned on the same line as the radial direction from the central axis of the front housing 12. Thus, when the stator frame 34 is assembled to the front housing 12, the front housing 12 and the stator frame 34 are easily aligned coaxially, and the excellent assembling workability is obtained.

The present invention is not limited to the above-described embodiments, and includes various modifications and equivalent configurations within the spirit of the appended claims. For example, the above embodiments are described in detail in order to explain the present invention in an easy-to-understand manner, and the present invention is not necessarily limited to a case including all the described configurations. In addition, a portion of the configuration of one embodiment may be replaced with the configuration of another embodiment. Further, the configuration of one embodiment may be added to the configuration of another embodiment. Regarding some components in the embodiments, other components may be added, deleted, and replaced.

For example, the stator frame 34 and the rear housing 11 may be integrated, and the stator 3 does not depend on a winding structure (for example, concentrated winding or distributed winding).

REFERENCE SIGNS LIST 3 stator
4 rotor
11 rear housing
12 front housing
15 coolant flow path
16 O-ring
34 stator frame
100 rotating electrical machine
111 coolant introduction port
112 coolant discharge port
123 recess portion
131 sealing member
132 convex portion
133 base portion
133A base first portion
133B base second portion
133C contact portion
134 space forming portion
135A first space portion
135B second space portion

The invention claimed is:
1. A rotating electrical machine comprising:
a stator core around which a winding is wound;
a stator frame that supports the stator core;
a housing that is disposed outside the stator frame and forms a flow path space with the stator frame; and
a sealing member that is disposed between the stator frame and the housing,
wherein the housing includes a mounting portion on which the sealing member is mounted, and
the sealing member includes
a base portion that is in contact with the housing and the stator frame, the base portion defining, on a side that is in contact with the stator frame, a first groove and a second groove, the second groove extending from the first grove, the first groove having a width greater than twice a width of the second groove, and
an attachment portion that protrudes from the base portion and is inserted to the mounting portion of the housing.
2. The rotating electrical machine according to claim 1, wherein the first groove and the second groove of the base portion define a space forming portion at a position opposing the stator frame, the space forming portion being capable of deforming a lower surface shape by pressing of the stator frame and the housing.
3. The rotating electrical machine according to claim 2, wherein the space forming portion forms a space capable of being reduced by pressing of the stator frame and the housing.
4. The rotating electrical machine according to claim 3, wherein the base portion includes a base first portion provided on a left side of the attachment portion and a base second portion provided on a right side of the attachment portion.

5. The rotating electrical machine according to claim 4, wherein the space forming portion includes the first groove provided between the base first portion and the base second portion.

6. The rotating electrical machine according to claim 5, wherein the space forming portion forms the first groove on a lower surface side, and forms the second groove that protrudes from the first groove toward the attachment portion.

* * * * *